(12) United States Patent
Dancie et al.

(10) Patent No.: US 11,307,747 B2
(45) Date of Patent: Apr. 19, 2022

(54) EDGE GESTURE INTERFACE WITH SMART INTERACTIONS

(71) Applicant: Snap Inc., Santa Monica, CA (US)

(72) Inventors: Nicolas Dancie, Montreuil (FR); Charly Delaroche, Alfortville (FR); Alexis Druon, Paris (FR); Nicolas Fallourd, Domont (FR); Ugo Latargere, Paris (FR); Antoine Martin, Paris (FR)

(73) Assignee: Snap Inc., Santa Monica, CA (US)

( * ) Notice: Subject to any disclaimer, the term of this patent is extended or adjusted under 35 U.S.C. 154(b) by 18 days.

(21) Appl. No.: 16/946,946

(22) Filed: Jul. 13, 2020

(65) Prior Publication Data
US 2021/0011612 A1 Jan. 14, 2021

Related U.S. Application Data

(60) Provisional application No. 62/873,077, filed on Jul. 11, 2019.

(51) Int. Cl.
| | | |
|---|---|---|
| G06F 3/048 | (2013.01) | |
| G06F 3/04845 | (2022.01) | |
| G06F 3/0488 | (2022.01) | |
| G06T 11/20 | (2006.01) | |

(52) U.S. Cl.
CPC ........ G06F 3/04845 (2013.01); G06F 3/0488 (2013.01); G06T 11/20 (2013.01)

(58) Field of Classification Search
CPC ..... G06F 3/04845; G06F 3/0488; G06T 11/20
See application file for complete search history.

(56) References Cited

U.S. PATENT DOCUMENTS

| | | | |
|---|---|---|---|
| 5,880,731 | A | 3/1999 | Liles et al. |
| 6,023,270 | A | 2/2000 | Brush, II et al. |
| 6,223,165 | B1 | 4/2001 | Lauffer |
| 6,772,195 | B1 | 8/2004 | Hatlelid et al. |
| 6,842,779 | B1 | 1/2005 | Nishizawa |

(Continued)

FOREIGN PATENT DOCUMENTS

| | | |
|---|---|---|
| CN | 109863532 | 6/2019 |
| CN | 110168478 | 8/2019 |

(Continued)

*Primary Examiner* — Rashawn N Tillery
(74) *Attorney, Agent, or Firm* — Schwegman Lundberg & Woessner, P.A.

(57) ABSTRACT

Methods, systems, user interfaces, media, and devices provide a geographically-based graphical user interface (GUI) suited to single-handed operation of a device. The method and system provide for causing display of a GUI including map data displayed in a first view; receiving input comprising at least one input point; determining first and second characteristics of the input; processing; when the first characteristic fulfils a first operational mode criterion, the input according to a first operational mode and causing display of the map data in a second view, the second view being based on the second characteristic of the input; and processing, when the first characteristic of the input fulfils a second operational mode criterion, the input according to a second operational mode, and causing display of the map data in a third view, the third view being based on the second characteristic of the input.

18 Claims, 12 Drawing Sheets

(56) References Cited

U.S. PATENT DOCUMENTS

| | | |
|---|---|---|
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 7,971,156 B2 | 6/2011 | Albertson et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,605,094 B1 * | 12/2013 | Alfaro ............... H04W 4/21 345/440 |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,158,414 B1 * | 10/2015 | Gluzberg ............... G06F 3/0488 |
| 9,225,897 B1 | 12/2015 | Sehn |
| 9,241,184 B2 | 1/2016 | Weerasinghe |
| 9,256,860 B2 | 2/2016 | Herger et al. |
| 9,276,886 B1 | 3/2016 | Samaranayake |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,102,423 B2 | 10/2018 | Shaburov et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,284,508 B1 | 5/2019 | Allen et al. |
| 10,362,219 B2 | 7/2019 | Wilson et al. |
| 10,439,972 B1 | 10/2019 | Spiegel et al. |
| 10,475,225 B2 | 11/2019 | Park et al. |
| 10,504,266 B2 | 12/2019 | Blattner et al. |
| 10,509,466 B1 | 12/2019 | Miller et al. |
| 10,514,876 B2 | 12/2019 | Sehn |
| 10,573,048 B2 | 2/2020 | Ni et al. |
| 10,614,855 B2 | 4/2020 | Huang |
| 10,657,701 B2 | 5/2020 | Osman et al. |
| 10,748,347 B1 | 8/2020 | Li et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |

(56) References Cited

U.S. PATENT DOCUMENTS

| | | |
|---|---|---|
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0325321 A1* | 12/2013 | Pylappan ............... G01C 21/20 701/420 |
| 2014/0043329 A1 | 2/2014 | Wang et al. |
| 2014/0055554 A1 | 2/2014 | Du et al. |
| 2014/0111451 A1* | 4/2014 | Park ................... G06F 3/04883 345/173 |
| 2014/0125678 A1 | 5/2014 | Wang et al. |
| 2014/0129343 A1 | 5/2014 | Finster et al. |
| 2014/0329548 A1* | 11/2014 | Tharshanan .......... H04W 4/029 455/457 |
| 2015/0186004 A1* | 7/2015 | Gordon ................. G01C 21/367 345/173 |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2016/0378286 A1* | 12/2016 | Ke ...................... G06F 3/04886 715/764 |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |
| 2019/0268294 A1* | 8/2019 | Gao ....................... G06F 9/543 |
| 2020/0117340 A1* | 4/2020 | Amitay .................. H04L 67/12 |
| 2021/0074016 A1 | 3/2021 | Li et al. |
| 2021/0166732 A1 | 6/2021 | Shaburova et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |

FOREIGN PATENT DOCUMENTS

| | | |
|---|---|---|
| EP | 2184092 | 5/2010 |
| JP | 2001230801 | 8/2001 |
| JP | 5497931 | 3/2014 |
| KR | 101445263 | 9/2014 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |

* cited by examiner

EDGE GESTURE INTERFACE WITH SMART INTERACTIONS

PRIORITY CLAIM

This application claims the benefit of priority of U.S. Provisional Patent Application No. 62/873,077, filed Jul. 11, 2019, which is hereby incorporated by reference herein in its entirety.

BACKGROUND

The popularity of location sharing, particularly real-time location sharing, used in conjunction with a social networking application continues to grow. Users increasingly share their location with each other facilitated by dynamically updated map interfaces. Navigating map interfaces can at times present users with difficulties, particularly when the user has the use of only one hand. In the absence of a convenient input interface, the user's facility for interacting with shared location-based information is impeded. Embodiments of the present disclosure address these and other issues.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
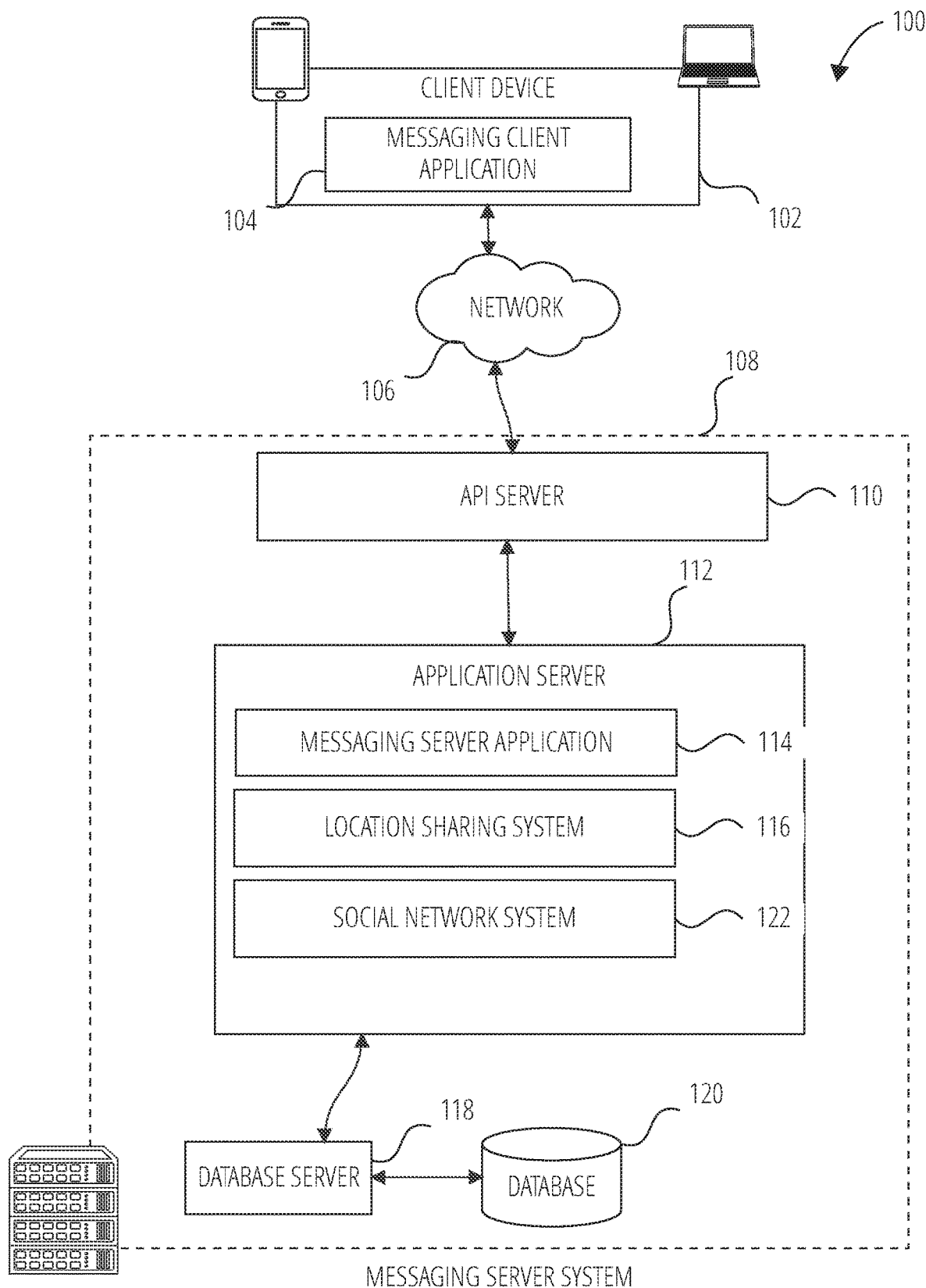
FIG. 1 is a diagrammatic representation of a networked environment in which a portable display device of the present disclosure may be deployed, in accordance with some example embodiments.

Embodiments of the present disclosure provide a geographically-based graphical user interface (GUI) suited to single-handed operation of a portable display device. This user interface may be referred to herein as a "map GUI," and may be used in conjunction with a location-sharing system.

Various embodiments of the present disclosure provide systems, methods, techniques, instruction sequences, and computing machine program products for dynamically displaying a map GUI of a computer system. The locations of participants of a communication session established via a messaging system, in particular an instant messaging system may be shared through such a map GUI.

Map data and user location data may be displayed and/or updated in real-time or almost real-time. However, where different users are close together or where the map data represents an entire city, for example, the user often desires to increase the scale (i.e. "zoom in") of the displayed map to allow greater map or user location detail to be discerned. In other scenarios, the opposite requirement is called for: the user may also wish to decrease the scale (i.e. "zoom out") of the displayed map to allow the broader context of the map data and/or geographic distribution of user locations to be identified.

Conventional map GUIs provide a zoom interaction in which the scale at which the map data is presented is altered in proportion with a measured value of a characteristic of a touchscreen gesture. Examples of such measured values include the change in distance between two distinct touch points in the so-called "pinch-to-zoom" mechanic, or the vertical distance covered in a single sliding gesture vertically upwards at the vertical edge of a touchscreen in the "edge zoom" mechanic.

The edge zoom mechanic facilitates single handed use, in which a single hand both grips the portable display device and a digit of the same hand touches a touchscreen to provide the sliding gesture. For example, the continuous sliding gesture is made by swiping the tip of the thumb along the screen edge while the map GUI presents map data.

The zoom interaction is not the only mode of interaction a user may wish to have with the map GUI. The user may additionally or alternatively wish to view a projection of a three-dimensional representation of a selected map location (i.e. "tilt mode"). In certain cases, the user may wish to view such a projection from a different angle relative to the map plane (i.e. tilt angle) rather than viewing the projection from directly overhead. Certain map applications include a facility for altering the tilt of user's line of sight.

Additionally or alternatively, the user may wish to rotate the map data presented on the screen of the portable display device (i.e. "rotation" mode), so that, for example, the user may orient the map data in a convenient manner. Rotation is typically achieved by applying a twisting gesture in the pinch-to-zoom mechanic—an action which is inconvenient, if not impossible, in single handed operation.

Some embodiments provide various improvements over conventional geographically-based user interfaces by extending the range of interaction modes available to the user through user input from a single digit of a single hand.

Some embodiments provide for the recognition of the handedness of the one-handed user. Left-handed and right-handed operation may be distinguished and the subsequent input processed accordingly.

Some embodiments provide further improvements over conventional user interfaces by combining data from multiple data sources. This multiple data sources may be of different nature, for example, a geographical map data source and a user-related data source.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In some embodiments, a communication session is established via a messaging system between a plurality of participants. The messaging system receives, from a client device of a participant, via a wireless communication over a network, an electronic communication containing location information of the client device. The messaging system determines, based on the location information, a current location of the participant. The messaging system displays, on display screens of client devices of the other participants of the communication session, an indication of the location of the participant within a messaging user interface (messaging UI). In various embodiments, the collection and sharing of location information is presented as a selectable option within privacy settings of a device or application.

The present disclosure provides various improvements over conventional user interfaces. According to some embodiments, a multi-modal geographically-based user interface (map UI) is provided, thereby providing a more convenient interface for single-handed operation of a portable display device. Furthermore, the provided interface facilitates the combination of gestures in different input modes, improving the speed of a user's navigation of the map and user location data (e.g. navigating within the map UI to access the location of the participants) and ultimately making more efficient use of resources (processor, battery, screen space, and other such resources).

FIG. 1 is a block diagram showing an example messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, map data, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes a location sharing system 116 supporting a geographically-based GUI (i.e. map UI). In some embodiments, the geographically-based GUI may include, in addition to map data representing a portion of a geographic map, representations of at least approximate respective positions of a user of client device 102 and of other users (e.g. the positions of a user's friends in a social network graph accessed by the social media application) using avatars for each respective user.

The social network system 122 may receive user authorization to use, or refrain from using, the user's location information. In some embodiments, the social network system 122 may likewise opt to share or not share the user's location with others via the map UI. In some cases, the user's avatar may be displayed to the user on the display screen of the user's computing device regardless of whether the user is sharing his or her location with other users.

In some embodiments, when viewing the map UI, the user is able to see the location of all his/her friends that have shared their location with the user on the map, each friend represented by their respective avatar.

In some embodiments, the user can select between friends on the map via a menu, such as a carousel. In some embodiments, selecting a particular friend automatically centers the map view on the avatar of that friend. Embodiments of the present disclosure may also allow the user to take a variety of actions with the user's friends from within the map UI. For example, the system may allow the user to chat with the user's friends without leaving the map. In one particular example, the user may select a chat icon from a menu presented in conjunction with the map UI to initiate a chat session.

The application server 112 is communicatively coupled to a database server 118, which facilitates access to a database 120 in which is stored data associated with messages processed by the messaging server application 114.

Figure 2:
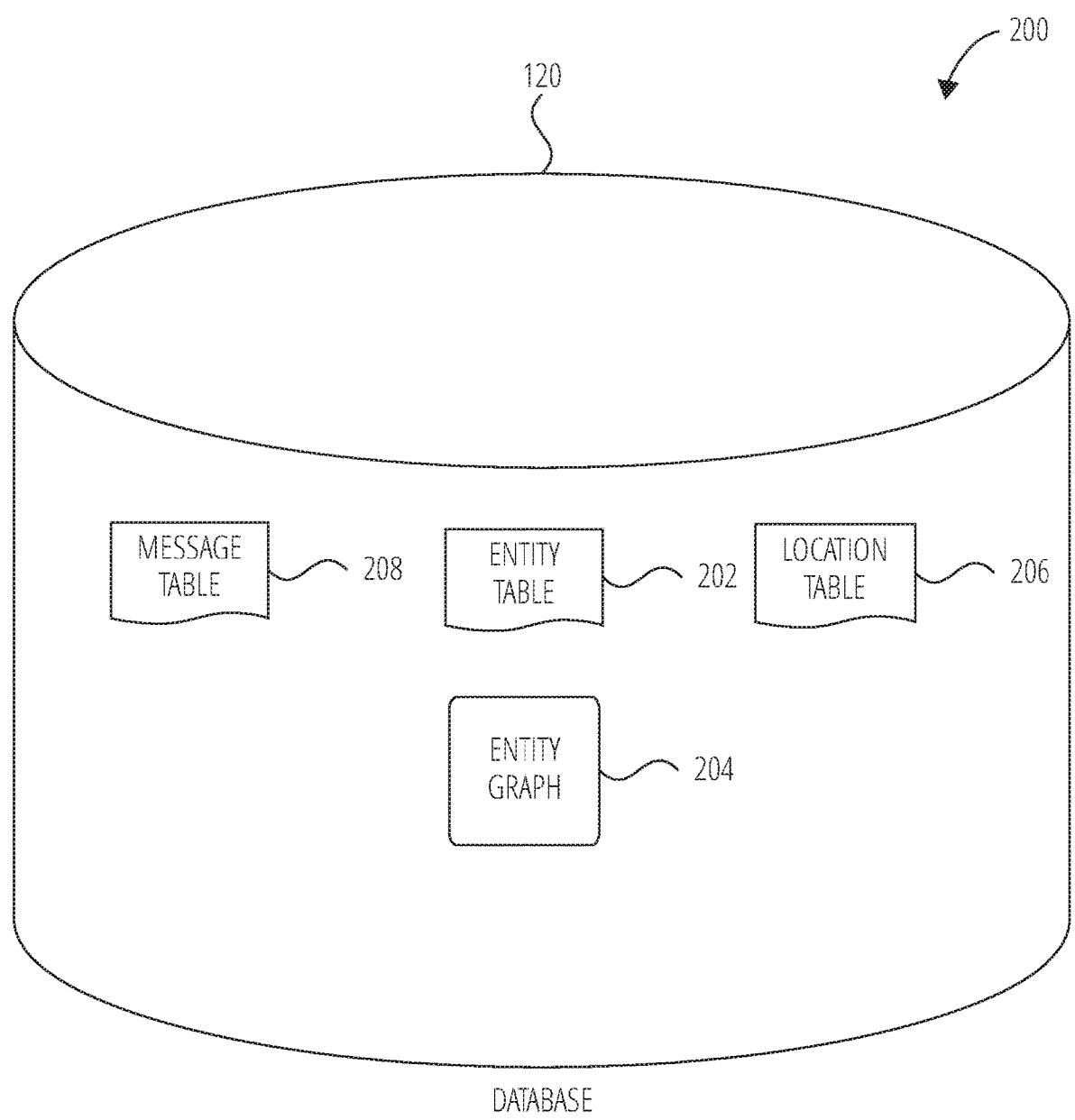
FIG. 2 is a diagrammatic representation of a data structure as maintained in a database, in accordance with some example embodiments.

The social network system 122 supports various social networking functions services and makes these functions and services available to the messaging server application 114. To this end, the social network system 122 maintains and accesses an entity graph 204 (as shown in FIG. 2) within the database 120. Examples of functions and services supported by the social network system 122 include the identification of other users of the messaging system 100 with which a particular user has relationships or is "following", and also the identification of other entities and interests of a particular user.

FIG. 2 is a schematic diagram illustrating data structures 200 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 208. An entity table 202 stores entity data, including an entity graph 204. Entities for which records are maintained within the entity table 202 may include individuals (e.g., users), corporate entities, organizations, objects, places, events, etc. Regardless of type, any entity regarding which the messaging server system 108 stores data may be a recognized entity. Each entity is provided with a unique identifier, as well as an entity type identifier (not shown). The entity graph 204 furthermore stores information regarding relationships and associations between entities. Such relationships may be social, professional (e.g., work at a common corporation or organization) interested-based or activity-based, merely for example. A location table 206 stores historical and current location information of users (e.g., geolocation information determined by the position components 538 of the client device 102).

Figure 3:
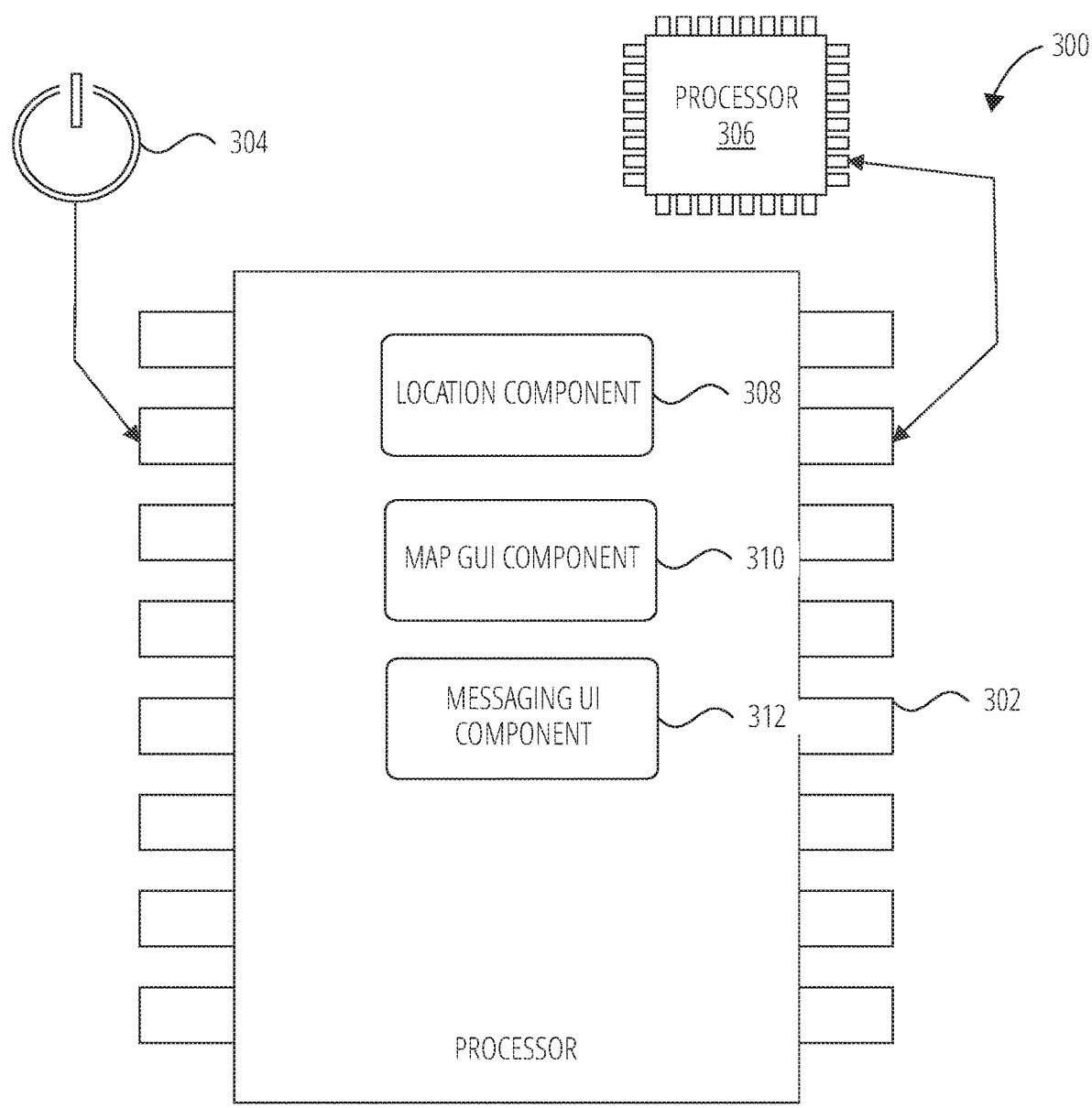
FIG. 3 is a diagrammatic representation of a processing environment, in accordance with some example embodiments.

Turning now to FIG. 3, there is shown a diagrammatic representation of a processing environment 300, which includes at least a processor 302 (e.g., a GPU, CPU or combination thereof).

The processor 302 is shown to be coupled to a power source 304, and to include (either permanently configured or temporarily instantiated) modules, namely a location component 308, a map UI component 310, and a messaging UI component 312. The location component 308 operationally determines locations of users based on location information. The map UI component 310 operationally generates user interfaces and causes the user interfaces to be displayed on client devices. The messaging UI component 312 operationally generates user interfaces and causes the user interfaces to be displayed on client devices. As illustrated, the processor 302 may be communicatively coupled to another processor 306.

Figure 4:
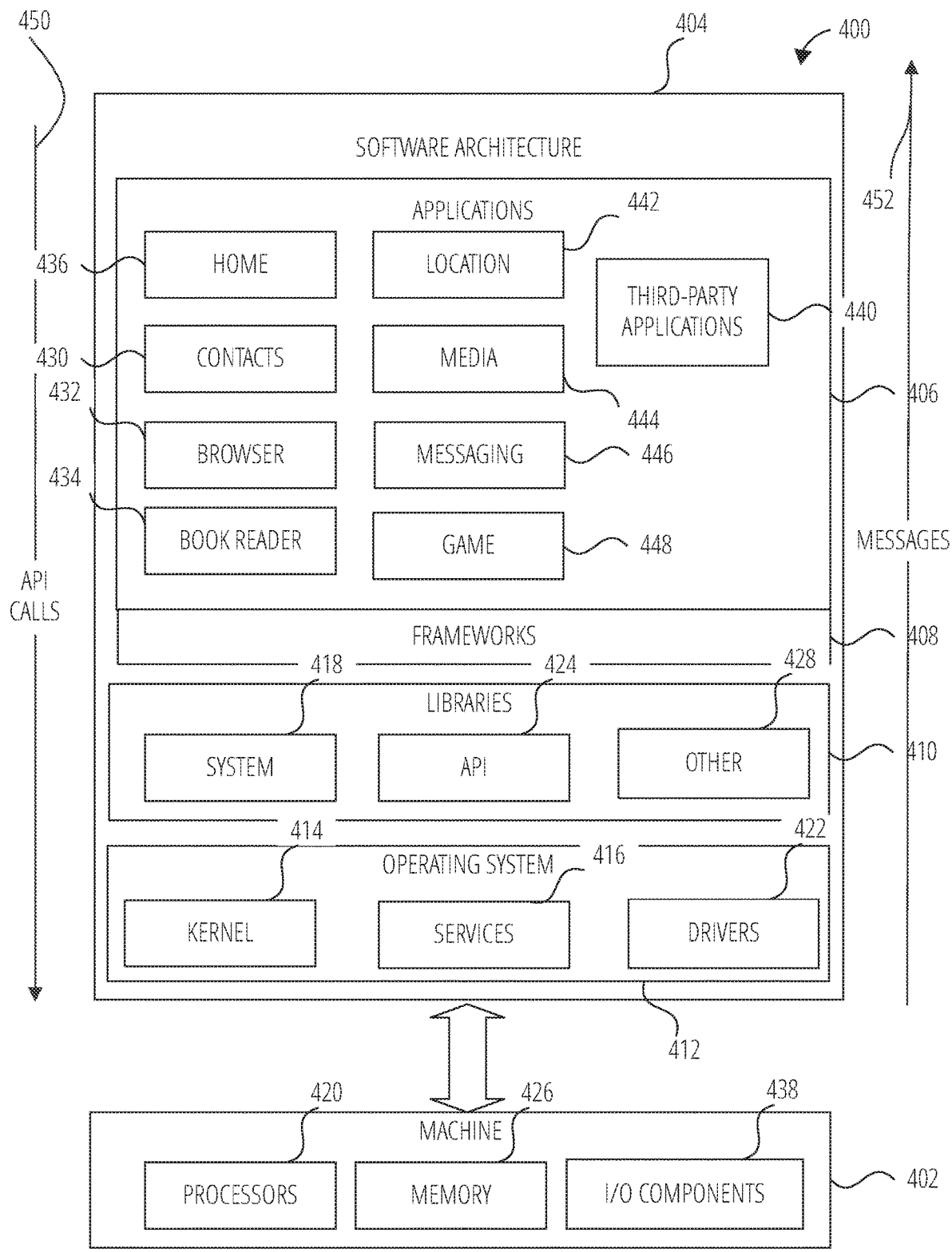
FIG. 4 is block diagram showing a software architecture within which the present disclosure may be implemented, in accordance with some example embodiments.

FIG. 4 is a block diagram 400 illustrating a software architecture 404, which can be installed on any one or more of the devices described herein, in particular upon the client device 102. The software architecture 404 is supported by hardware such as a machine 402 that includes processors 420, memory 426, and I/O components 438. In this example, the software architecture 404 can be conceptualized as a stack of layers, where each layer provides a particular functionality. The software architecture 404 includes layers such as an operating system 412, libraries 410, frameworks 408, and applications 406. Operationally, the applications 406 invoke API calls 450 through the software stack and receive messages 452 in response to the API calls 450.

The operating system 412 manages hardware resources and provides common services. The operating system 412 includes, for example, a kernel 414, services 416, and drivers 422. The kernel 414 acts as an abstraction layer between the hardware and the other software layers. For example, the kernel 414 provides memory management, processor management (e.g., scheduling), component management, networking, and security settings, among other functionality. The services 416 can provide other common services for the other software layers. The drivers 422 are responsible for controlling or interfacing with the underlying hardware. For instance, the drivers 422 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 410 provide a low-level common infrastructure used by the applications 406. The libraries 410 can include system libraries 418 (e.g., C standard library) that provide functions such as memory allocation functions, string manipulation functions, mathematic functions, and the like. In addition, the libraries 410 can include API libraries 424 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 410 can also include a wide variety of other libraries 428 to provide many other APIs to the applications 406.

The frameworks 408 provide a high-level common infrastructure that is used by the applications 406. For example, the frameworks 408 provide various graphical user interface (GUI) functions, high-level resource management, and high-level location services. The frameworks 408 can provide a broad spectrum of other APIs that can be used by the applications 406, some of which may be specific to a particular operating system or platform.

In an example embodiment, the applications 406 may include a home application 436, a contacts application 430, a browser application 432, a book reader application 434, a location application 442, a media application 444, a messaging application 446, a game application 448, and a broad assortment of other applications such as third-party applications 440. The applications 406 are programs that execute functions defined in the programs. Various programming languages can be employed to create one or more of the applications 406, structured in a variety of manners, such as object-oriented programming languages (e.g., Objective-C, Java, or C++) or procedural programming languages (e.g., C or assembly language). In a specific example, the third-party applications 440 (e.g., applications developed using the ANDROM™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 440 can invoke the API calls 450 provided by the operating system 412 to facilitate functionality described herein.

The location application 442, when executed, may implement the geographically-based GUI, which in turn may cause the display of map data and user location data.

Figure 5:
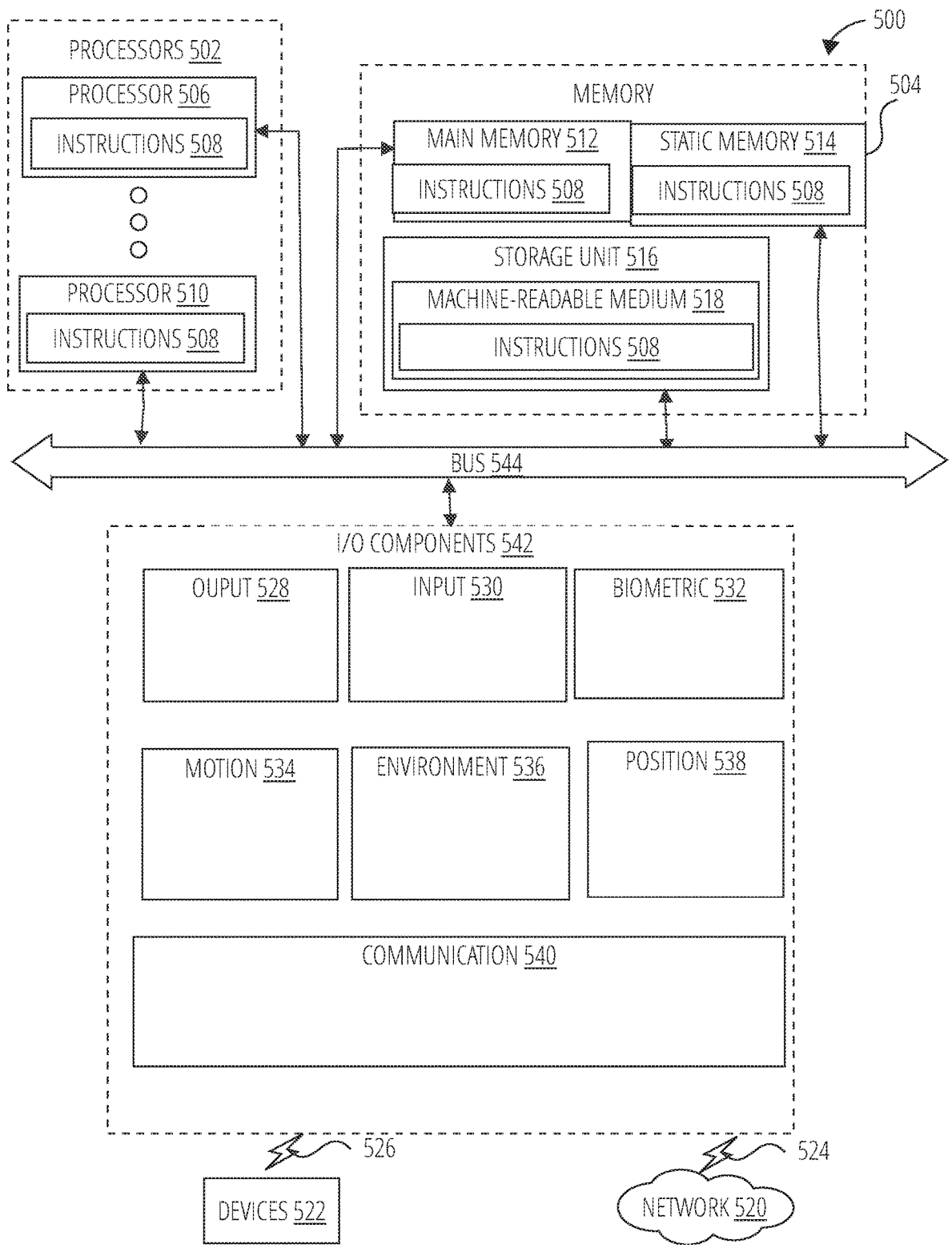
FIG. 5 is a diagrammatic representation of a machine, in the form of a computer system within which a set of instructions may be executed for causing the machine to perform any one or more of the methodologies discussed, in accordance with some example embodiments.

FIG. 5 is a diagrammatic representation of a machine 500 within which instructions 508 (e.g., software, a program, an application, an applet, an app, or other executable code) for causing the machine 500 to perform any one or more of the methodologies discussed herein may be executed. For example, the instructions 508 may cause the machine 500 to execute any one or more of the methods described herein. The instructions 508 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 508, sequentially or otherwise, that specify actions to be taken by the machine 500. Further, while only a single machine 500 is illustrated, the term "machine" shall also be taken to include a collection of machines that individually or jointly execute the instructions 508 to perform any one or more of the methodologies discussed herein.

The machine 500 may include processors 502, memory 504, and I/O components 542, which may be configured to communicate with each other via a bus 544. In an example embodiment, the processors 502 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RTIC), another processor, or any suitable combination thereof) may include, for example, a processor 506 and a processor 510 that execute the instructions 508. The term "processor" is intended to include multi-core processors that may comprise two or more independent processors (sometimes referred to as "cores") that may execute instructions contemporaneously. Although FIG. 5 shows multiple processors 502, the machine 500 may include a single processor with a single core, a single processor with multiple cores (e.g., a multi-core processor), multiple processors with a single core, multiple processors with multiples cores, or any combination thereof.

The memory 504 includes a main memory 512, a static memory 514, and a storage unit 516, both accessible to the processors 502 via the bus 544. The main memory 504, the static memory 514, and storage unit 516 store the instructions 508 embodying any one or more of the methodologies or functions described herein. The instructions 508 may also reside, completely or partially, within the main memory 512, within the static memory 514, within machine-readable medium 518 within the storage unit 516, within at least one of the processors 502 (e.g., within the processor's cache memory), or any suitable combination thereof, during execution thereof by the machine 500.

The I/O components 542 may include a wide variety of components to receive input, provide output, produce output, transmit information, exchange information, capture measurements, and so on. The specific I/O components 542 that are included in a particular machine will depend on the type of machine. For example, portable machines such as mobile phones may include a touch input device or other such input mechanisms. It will be appreciated that the I/O components 542 may include many other components that are not shown in FIG. 5. In various example embodiments, the I/O components 542 may include output components 528 and input components 530. The output components 528 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 530 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In certain classes of machine, it may be convenient to provide integrated I/O components that operate as both input and output components. In portable machines such as mobile phones, a touch input device may be integrated with a display device to provide a touchscreen display. Such touchscreen display devices may allow the user to input commands as hand, stylus or finger gestures that are visually associated with elements displayed in a graphical user interface. The resulting graphical user interface is thus convenient and intuitive for non-expert users.

In further example embodiments, the I/O components 542 may include biometric components 532, motion components 534, environmental components 536, or position components 538, among a wide array of other components. For example, the biometric components 532 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 534 include acceleration sensor components (e.g., accelerometer), gravitation sensor components, rotation sensor components gyroscope), and so forth. The environmental components 536 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects, as well as optical, ultrasonic, capacitive or and magnetic sensors), gas sensors (e.g., gas detection sensors to detection concentrations of hazardous gases for safety or to measure pollutants in the atmosphere), or other components that may provide indications, measurements, or signals corresponding to a surrounding physical environment. The position components 538 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 542 further include communication components 540 operable to couple the machine 500 to a network 520 or devices 522 via a coupling 524 and a coupling 526, respectively. For example, the communication components 540 may include a network interface component or another suitable device to interface with the network 520. In further examples, the communication components 540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 522 may be another machine or any of a wide variety of peripheral devices (e.g., a peripheral device coupled via a USB).

Moreover, the communication components 540 may detect identifiers or include components operable to detect identifiers. For example, the communication components 540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 540, such as location via Internet Protocol (IP) geolocation, location via Wi-Fi® signal triangulation, location via detecting an NFC beacon signal that may indicate a particular location, and so forth.

The various memories (e.g., memory 504, main memory 512, static memory 514, and/or memory of the processors 502) and/or storage unit 516 may store one or more sets of instructions and data structures (e.g., software) embodying or used by any one or more of the methodologies or functions described herein. These instructions (e.g., the instructions 508), when executed by processors 502, cause various operations to implement the disclosed embodiments.

The instructions 508 may be transmitted or received over the network 520, using a transmission medium, via a network interface device (e.g., a network interface component included in the communication components 540) and using any one of a number of well-known transfer protocols (e.g., hypertext transfer protocol (HTTP)). Similarly, the instructions 508 may be transmitted or received using a transmission medium via the coupling 526 (e.g., a peer-to-peer coupling) to the devices 522.

Figure 6:
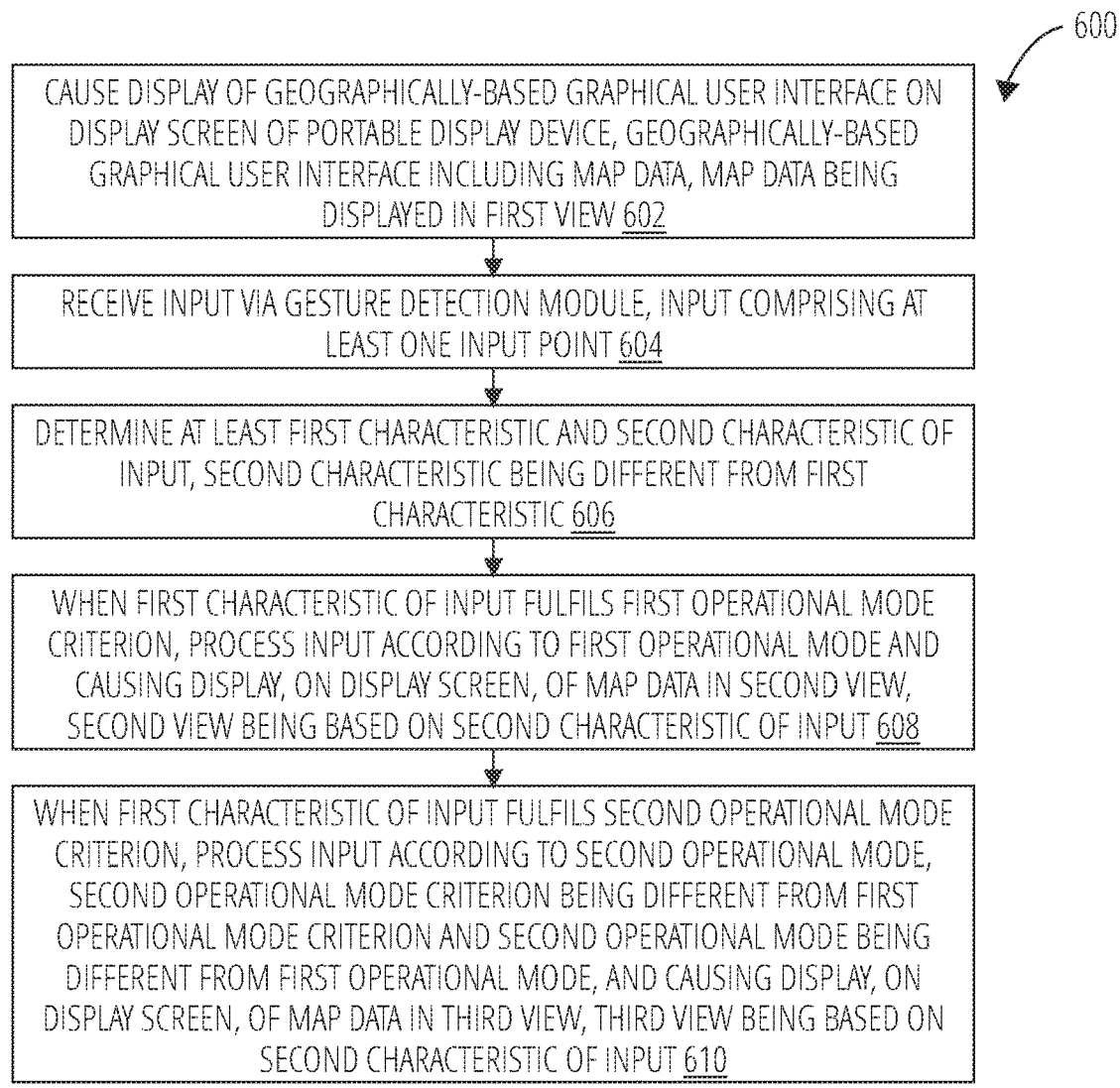
FIG. 6 illustrates a method in accordance with some example embodiments.

FIG. 6 is a flowchart illustrating a method 600 for presenting map data via a geographically-based user interfaces. Where user location data is available, the method further facilitates sharing of the respective locations of other users. The method 600 may be embodied in computer-readable instructions for execution by one or more processors (e.g., processor 302) such that the steps of the method 600 may be performed in part or in whole by functional components (e.g., location component 308, map UI component 312, messaging UI component 312) of a client device 102 with a processing environment 300; accordingly, the method 600 is described below by way of example with reference thereto. However, the method 600 may be deployed on various other hardware configurations and is not intended to be limited to the functional components of the processing environment 300.

In operation 602, a processor of a portable display device causes the display of a geographically-based graphical user interface on a display screen of the portable display device. The geographically-based graphical user interface includes map data. The map data may be displayed in a first view, i.e. from a particular perspective, projection or point of view and at a particular scale.

In operation 604, the processor receives input via a gesture detection module, the input comprising at least one input point. In some embodiments, the input is a swipe-touch gesture where the user's finger contacts the touchscreen of the portable display device at a first location on the screen, maintains contact as a finger movement is executed, and then ceases contact at a second location on the screen. In some embodiments, the level of finger pressure is measured during a touch gesture so that the input is a long-press gesture where the user's finger contacts the touchscreen of the portable display device, maintains contact while applying a varying amount of pressure, and then ceases contact on the screen. In some embodiments, the input comprises a time-separated sequence of input points provided in single-handed operation of the portable display device. The single-handed operation may be operation by the right hand or by the left hand alone of the user.

In operation 606, the processor determines at least a first characteristic and a second characteristic of the input, where the second characteristic is different from the first characteristic. Examples of first and second characteristic include: horizontal displacement (X) of an initial input point relative to a point at an edge of the display screen; a count of the number of tap gestures in a predetermined period of time; a duration of a single press touch; a measure of the pressure applied in a press touch; vertical displacement (Y) relative to an initial point in the map data; and vertical speed ($v_y$) or horizontal speed ($v_x$) of a displacement from an initial input point to a subsequent input point in the input.

In some embodiments, the first operational mode criterion may be fulfilled when the first characteristic takes a value in a first range of values. Additionally, the second operational mode criterion may be fulfilled when the first characteristic takes a value in a second range of values.

When it is determined that the first characteristic of the input fulfils a first operational mode criterion, the processor processes the input according to a first operational mode and causing the display screen to display the map data in a second view, the second view being based on the second characteristic of the input (operation 608). In some embodiments, the second view may differ from the first view in respect of at least one of perspective, projection or point of view and scale.

In operation 610, when it is determined the first characteristic of the input fulfils a second operational mode criterion, the processor processes the input according to a second operational mode. The second operational mode criterion is different from the first operational mode criterion and the second operational mode is different from the first operational mode. The processor then causes the display screen to display the map data in a third view, the third view being based on the second characteristic of the input. In some embodiments, the third view may differ from the first and the second view in respect of at least one of perspective, projection or point of view and scale.

In some embodiments, the first operational mode and the second operational mode may each be selected from a group of operational modes including a tilt operation mode, a rotate operation mode, a drag operation mode, and a zoom operation mode.

In certain embodiments, processing the input according to the tilt operation mode may comprise changing the angle of tilt of a projection of the map data displayed on the display screen from a default tilt angle to an input tilt angle proportional to the second characteristic of the input.

In certain embodiments, processing the input according to the rotate operation mode may comprise changing the orientation of the map data displayed on the display screen from a default orientation angle to an input rotation angle proportional to the second characteristic of the input.

In certain embodiments, processing the input according to the drag operation mode may comprise moving a center coordinate of the display screen relative to a default coordinate in the map data from the default coordinate to an input coordinate along a predetermined path, the magnitude of movement being proportional to the second characteristic of the input.

In certain embodiments, processing the input according to the zoom operation mode may comprise changing the orientation of the map data displayed on the display screen from a default scale to an input scale proportional to the second characteristic of the input.

In certain embodiments, the geographically-based graphical user interface may further include user location data for at least one user, the user location data being displayed in at least one of the first view, second view or third view by depicting an avatar associated with the at least one user.

In certain embodiments, the first operational mode criterion may be fulfilled when the first characteristic takes a value at an initial input point, regardless of the value of first characteristic taken by subsequent input points of the input.

In certain embodiments, the first operational mode criterion may be fulfilled when the first characteristic takes a value at an initial input point and the value of first characteristic taken by subsequent input points of the input remains within a tolerance range encompassing, and wider than, the first range of values.

In certain embodiments, the operation of the geographically-based graphical user interface in a given operational mode is indicated through the display of at least one graphical element over the map data of the geographically-based graphical user interface in a color or pattern corresponding to the respective operational mode.

In certain embodiments, the first characteristic is horizontal displacement (X) of an initial input point relative to a point at an edge of the display screen. In such embodiments, the first operational mode criterion may be fulfilled when the horizontal displacement takes a value in a first range of values. Additionally, the second operational mode criterion may be fulfilled when the horizontal displacement takes a value in a second range of values. In certain such embodiments, the second characteristic is vertical displacement (Y) relative to an initial point in the map data. FIGS. 7 to 12 illustrate various aspects of these embodiments.

Figure 7:
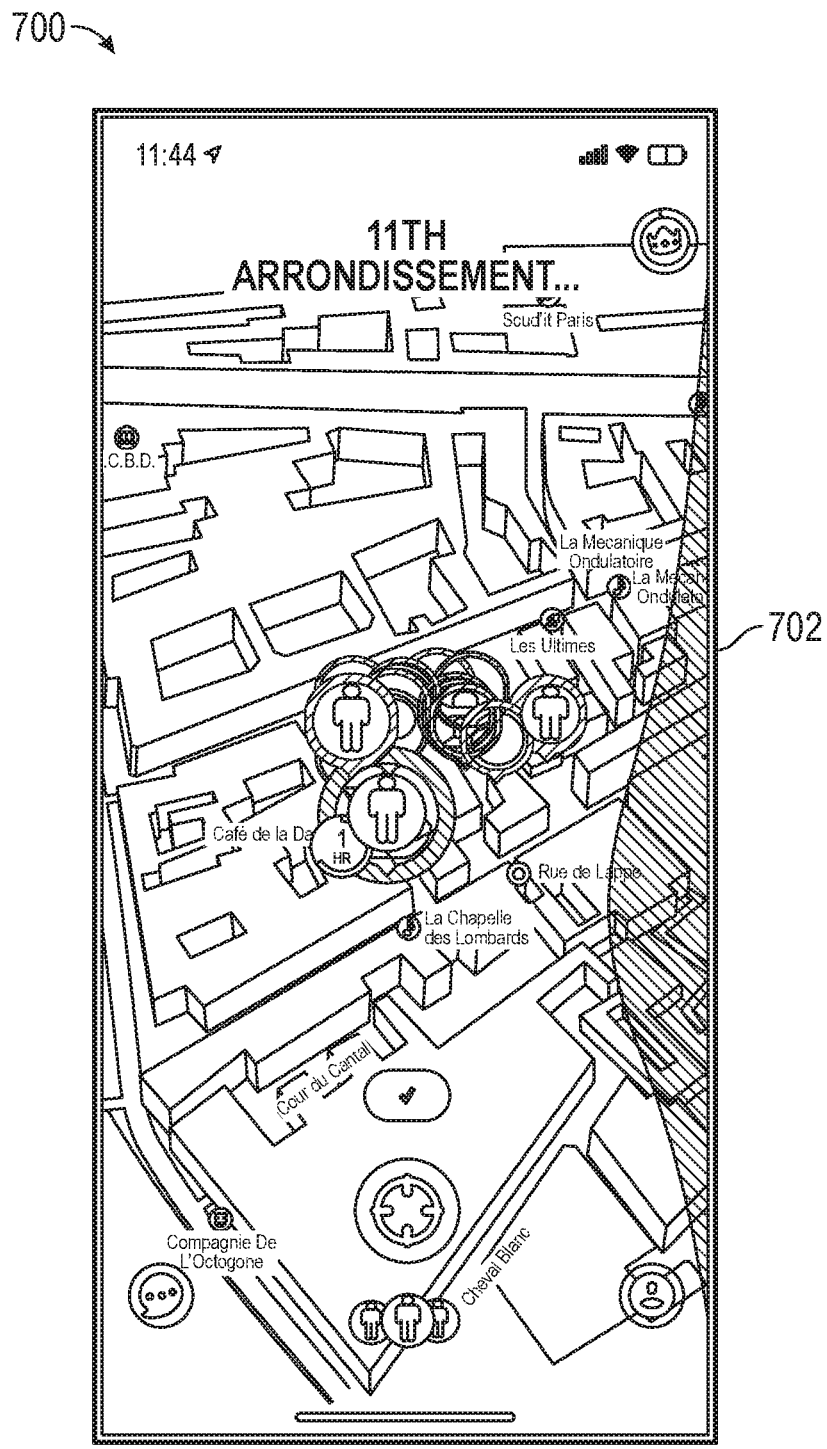
FIG. 7 illustrates a user interface in a zoom operation mode displayed on a display screen of a portable display device, in accordance with some example embodiments.
Figure 8:
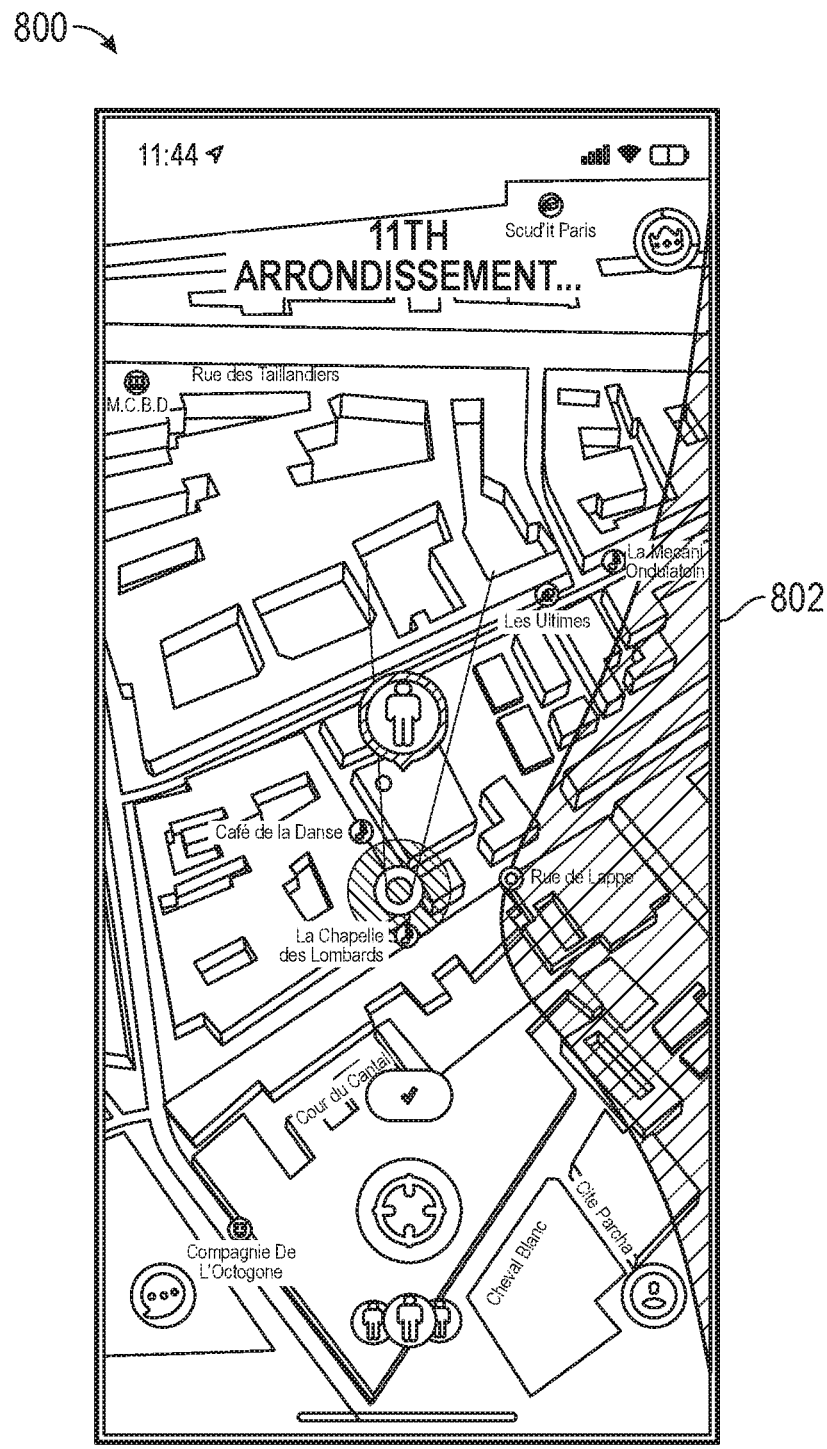
FIG. 8 illustrates a user interface in a tilt operation mode displayed on a display screen of a portable display device, in accordance with some example embodiments.
Figure 9:
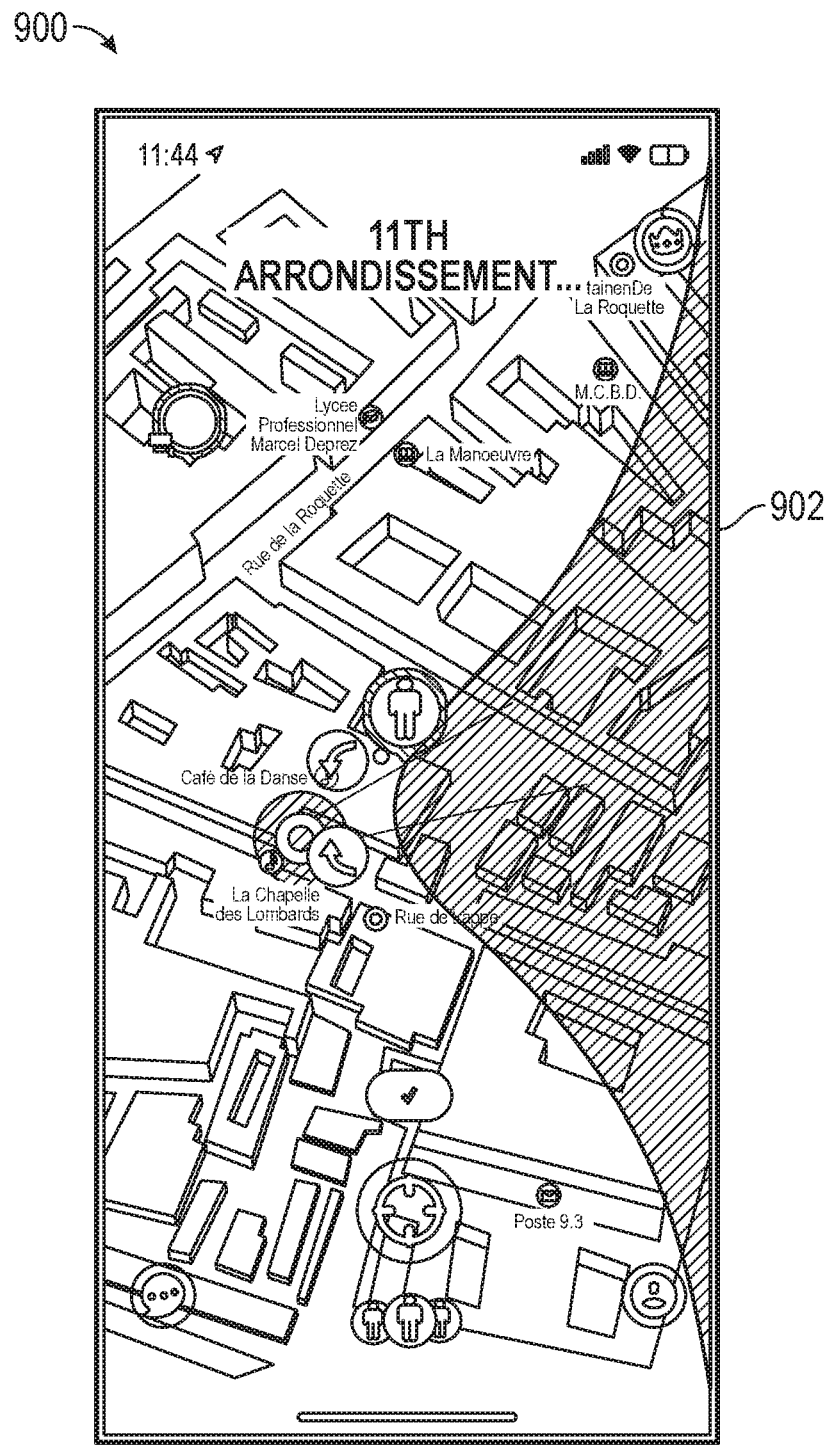
FIG. 9 illustrates a user interface in a rotate operation mode displayed on a display screen of a portable display device, in accordance with some example embodiments.

As shown in FIGS. 7 to 9, the input of a (right-handed) user is displayed as a partially transparent lobe component extending from the right-hand side of an example map GUI and overlaying map data in a first view. The furthest extent of the lobe component leftwards from the edge together with its vertical position corresponds to the current position at which the user is touching a touchscreen of a display device displaying the example map GUI.

FIG. 7 illustrates the map GUI in zoom operation mode. The horizontal displacement 702 of the leftwards lobe component is seen to be within a relatively short distance from the right-hand edge, in a range from $0>X>X_1$, where $X_1$ is the boundary of the range of horizontal displacement values associated with a zoom operation mode. Vertical displacement (Y) of the point at which the user touches the touchscreen in zoom operation mode is interpreted as an indication of the desired level of zoom (i.e. map scale). In some embodiments, the vertical displacement relative to the lower edge of the screen is in linear proportion to the desired level of zoom. In some embodiments, the vertical displacement relative to the lower edge of the screen is in logarithmic proportion to the desired level of zoom.

FIG. 8 illustrates the map GUI in tilt operation mode. The horizontal displacement 802 of the leftwards lobe component is seen to be within a distance from the right-hand edge, in a range from $X_1>X>X_2$, where $X_2$ is the upper boundary of the range of horizontal displacement values associated with a tilt operation mode. The underlying map data is seen to be viewed in a second view, presenting the map data in a three-dimensional projection having a lower viewing angle than in the first view illustrated in FIG. 7. Vertical displacement (Y) of the point at which the user touches the touchscreen in tilt operation mode is interpreted as an indication of the desired viewing angle (i.e. angle of tilt relative to a normal viewing angle from directly above).

FIG. 9 illustrates the map GU in rotate operation mode. The horizontal displacement 902 of the leftwards lobe component is seen to be within a distance from the right-hand edge, in a range from $X_2>X>X_3$, where $X_3$ is the upper boundary of the range of horizontal displacement values associated with a rotate operation mode. For the sake of illustration, the underlying map data is overlaid by an indicator of rotation. Vertical displacement (Y) of the point at which the user touches the touchscreen in zoom operation mode is interpreted as an indication of the desired angle of rotation in the plane of the map data. In some embodiments, displacing the user touch point upwards rotates the orientation of the points of the compass by a number of degrees proportional to the vertical displacement.

Figure 10:
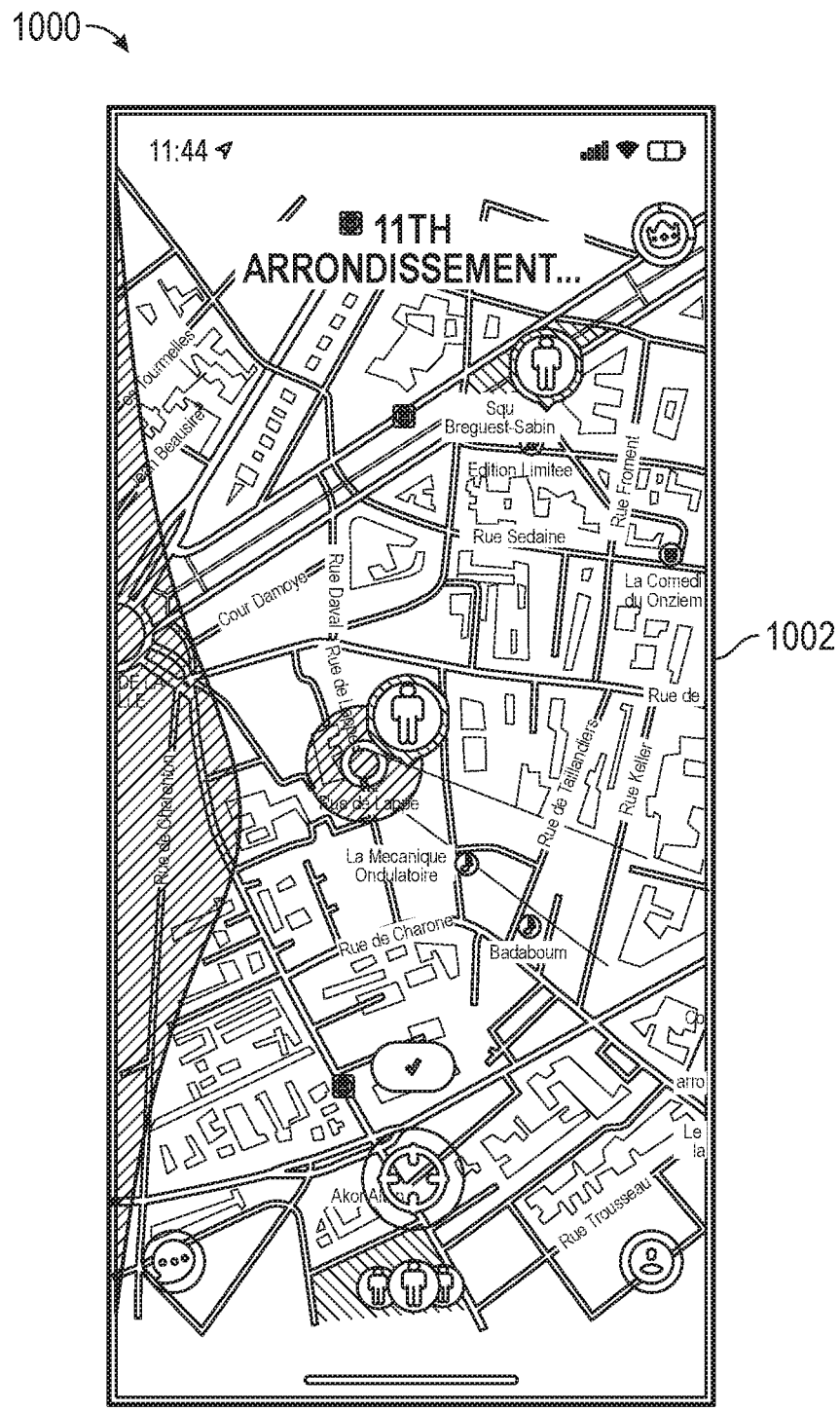
FIG. 10 illustrates a user interface in a zoom operation mode displayed on a display, screen of a portable display device, in accordance with some example embodiments.
Figure 11:
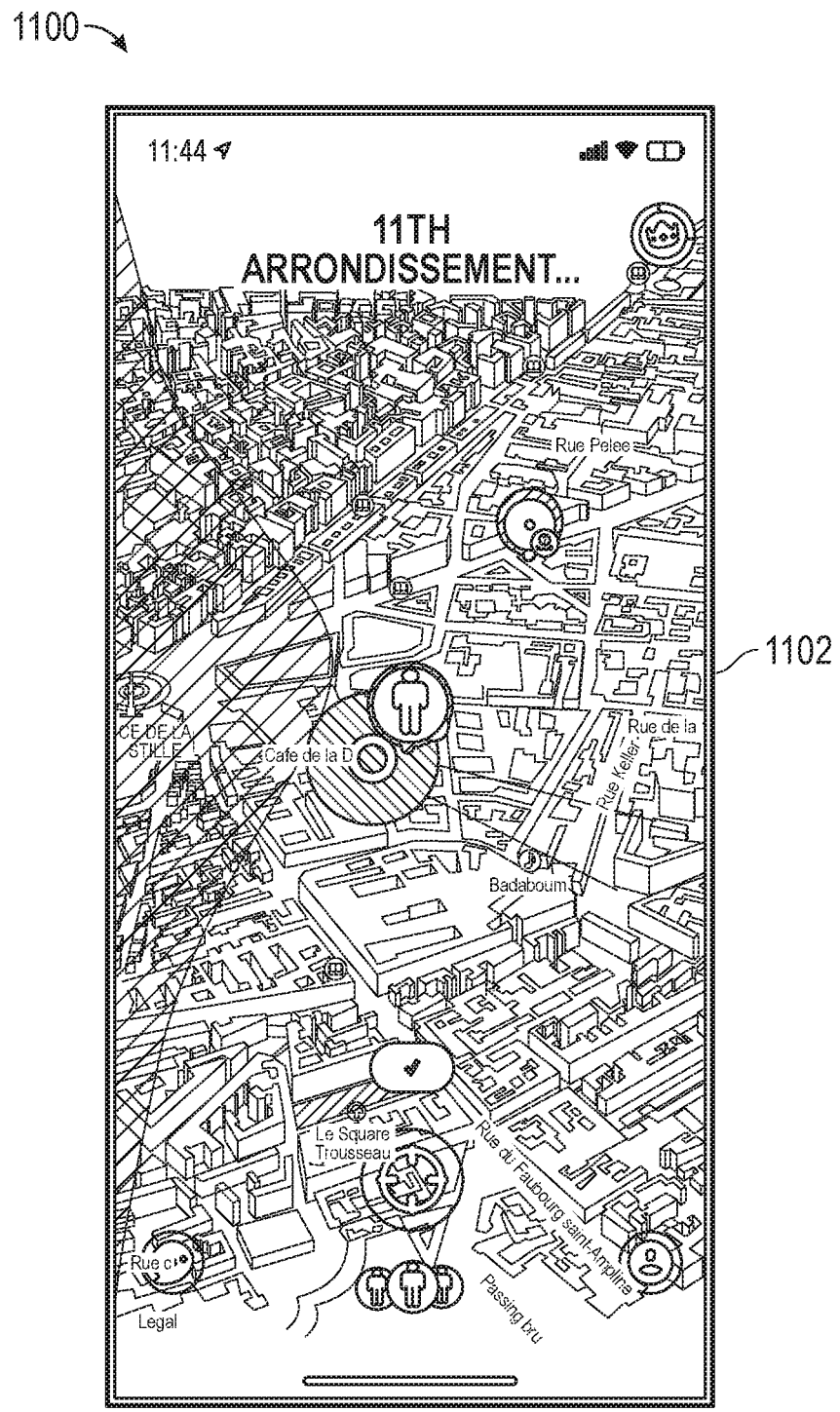
FIG. 11 illustrates a user interface in a tilt operation mode displayed on a display screen of a portable display device, in accordance with some example embodiments.
Figure 12:
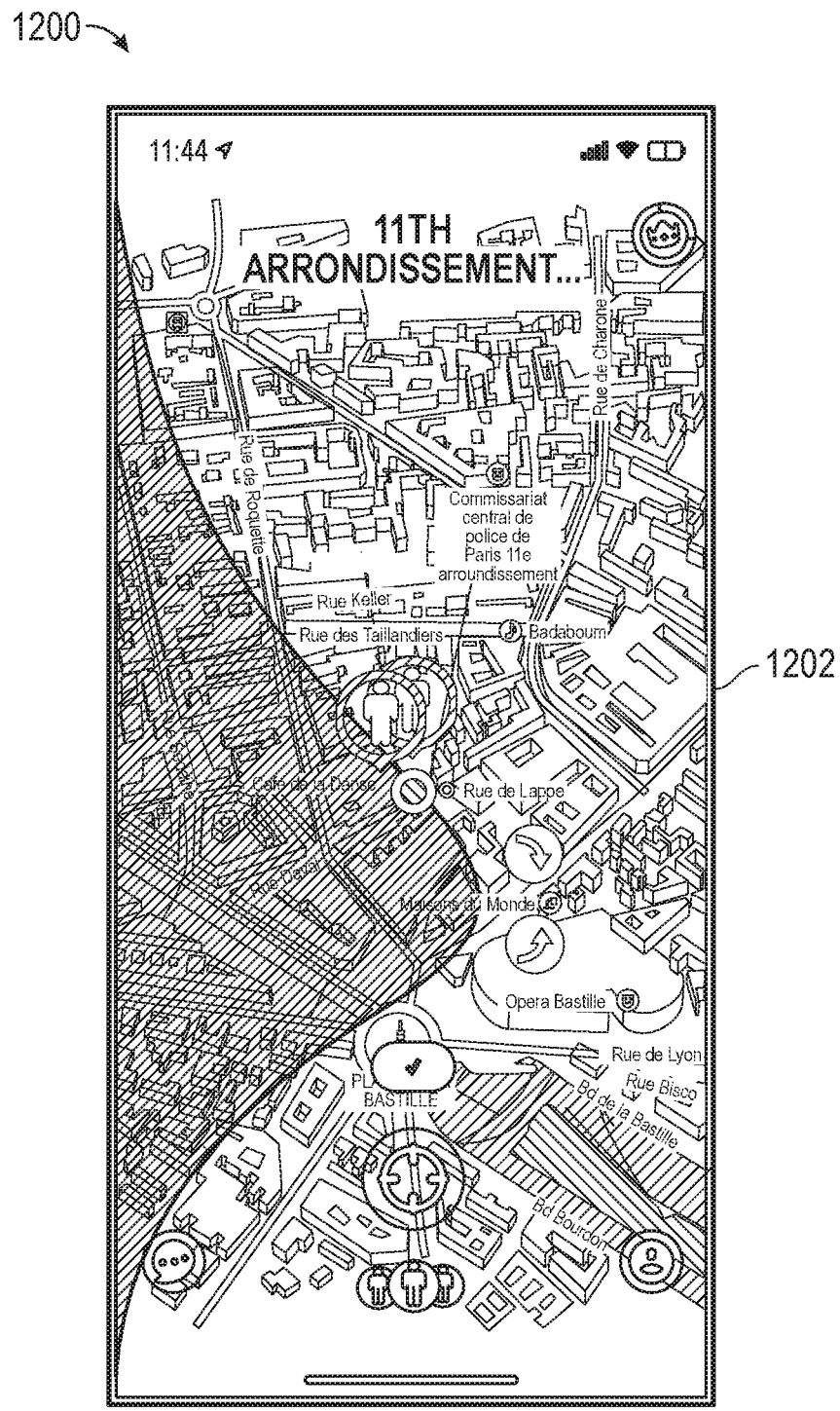
FIG. 12 illustrates a user interface in a rotate operation mode displayed on a display screen of a portable display device, in accordance with some example embodiments.

As shown in FIGS. 10 to 12, the input of a (left-handed) user is displayed as a partially transparent lobe component extending from the left-hand side of an example map GUI and overlaying map data in a first view. The furthest extent of the lobe component rightwards from the edge together with its vertical position corresponds to the current position at which the user is touching a touchscreen of a display device displaying the example map GUI. In essence, FIGS. 10 to 12 show the mirror image of the interface in FIGS. 7 to 9.

FIG. 10 illustrates a further embodiment of a map GUI in zoom operation mode. The horizontal displacement 1002 of the rightwards lobe component is seen to be within a relatively short distance from the left-hand edge, in a range from $0>X>X_1$, where $X_1$ is the boundary of the range of horizontal displacement values associated with a zoom operation mode. Vertical displacement (Y) of the point at which the user touches the touchscreen in zoom operation mode is interpreted as an indication of the desired level of zoom (i.e. map scale). In some embodiments, the vertical displacement relative to the lower edge of the screen is in linear proportion to the desired level of zoom. In some embodiments, the vertical displacement relative to the lower edge of the screen is in logarithmic proportion to the desired level of zoom.

FIG. 11 illustrates the map GUI in tilt operation mode. The horizontal displacement 1102 of the rightwards lobe component is seen to be within a distance from the left-hand edge, in a range from $X_1>X>X_2$, where $X_2$ is the upper boundary of the range of horizontal displacement values associated with a tilt operation mode. The underlying map data is seen to be viewed in a second view, presenting the map data in a three-dimensional projection having a lower viewing angle than in the first view illustrated in FIG. 10. Vertical displacement (Y) of the point at which the user touches the touchscreen in tilt operation mode is interpreted as an indication of the desired viewing angle (i.e. angle of tilt relative to a normal viewing angle from directly above).

FIG. 12 illustrates the map GUI in rotate operation mode. The horizontal displacement 1202 of the rightwards lobe component is seen to be within a distance from the left-hand edge, in a range from $X_2>X>X_3$, where $X_3$ is the upper boundary of the range of horizontal displacement values associated with a rotate operation mode. For the sake of illustration, the underlying map data is overlaid by an indicator of rotation. Vertical displacement (Y) of the point at which the user touches the touchscreen in zoom operation mode is interpreted as an indication of the desired angle of rotation in the plane of the map data. In some embodiments, displacing the user touch point upwards rotates the orientation of the points of the compass by a number of degrees proportional to the vertical displacement.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

"Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific integrated Circuit (ASIC), a Radio-Frequency Integrated Circuit (RFiC) or any combination thereof. A processor may further be a multi-core processor having two or more independent processors (sometimes referred to as "cores") that may execute instructions contemporaneously.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm), In other example embodiments, the processors or processor-implemented components may be distributed across a number of geographic locations.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Client Device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

What is claimed is:

1. A method comprising:
   causing display of a geographically-based graphical user interface on a display screen of a portable display device, the geographically-based graphical user interface including map data, the map data being displayed in a first view;
   receiving input comprising at least one input point;
   determining at least a first characteristic and a second characteristic of the input, the second characteristic being different from the first characteristic;
   processing, when the first characteristic of the input fulfils a first operational mode criterion, the input according to a first operational mode and causing display, on the display screen, of the map data in a second view, the second view being based on the second characteristic of the input; and
   processing, when the first characteristic of the input fulfils a second operational mode criterion, the input according to a second operational mode, the second operational mode criterion being different from the first operational mode criterion and the second operational mode being different from the first operational mode, and causing display, on the display screen, of the map data in a third view, the third view being based on the second characteristic of the input,
   wherein the first characteristic is horizontal displacement (X) of an initial input point relative to a point at an edge of the display screen,
   wherein the first operational mode criterion is fulfilled when the horizontal displacement takes a value in a first range of values, and
   wherein the second operational mode criterion is fulfilled when the horizontal displacement takes a value in a second range of values.

2. The method of claim 1, wherein the input comprises a time-separated sequence of input points provided in single handed operation of the portable display device.

3. The method of claim 1, wherein the first characteristic is at least one of: a count of a number of tap gestures in a predetermined period of time, a duration of a single press touch, or a measure of pressure applied in a press touch,
   wherein the first operational mode criterion is fulfilled when the first characteristic takes a value in a first range of values, and
   wherein the second operational mode criterion is fulfilled when the first characteristic takes a value in a second range of values.

4. The method of claim 1, wherein the second characteristic is a vertical displacement (Y) relative to an initial point in the map data.

5. The method of claim 1, wherein the second characteristic is a vertical speed ($v_y$) of a displacement from an initial input point to a subsequent input point in the input.

6. The method of claim 1, wherein the first operational mode and the second operational mode are selected from a group of operational modes including a tilt mode, a rotate mode, a drag mode, and a zoom mode.

7. The method of claim 6, wherein processing the input according to the tilt mode comprises changing an angle of tilt of a projection of the map data displayed on the display screen from a default tilt angle to an input tilt angle proportional to the second characteristic of the input.

8. The method of claim 6, wherein processing the input according to the rotate mode comprises changing an orientation of the map data displayed on the display screen from a default orientation angle to an input rotation angle proportional to the second characteristic of the input.

9. The method of claim 6, wherein processing the input according to the drag mode comprises moving a center coordinate of the display screen relative to a default coordinate in the map data from the default coordinate to an input coordinate along a predetermined path, a magnitude of movement being proportional to the second characteristic of the input.

10. The method of claim 6, wherein processing the input according to the zoom mode comprises changing an orientation of the map data displayed on the display screen from a default scale to an input scale proportional to the second characteristic of the input.

11. The method of claim 1, wherein the geographically-based graphical user interface further includes user location data for at least one user, the user location data being displayed in at least one of the first view, second view or third view by depicting an avatar associated with the at least one user.

12. The method of claim 1, wherein the first operational mode criterion is fulfilled when the first characteristic takes a value at an initial input point, regardless of the value of first characteristic taken by subsequent input points of the input.

13. The method of claim 1, wherein the first operational mode criterion is fulfilled when the first characteristic takes a value at an initial input point and the value of first characteristic taken by subsequent input points of the input remains within a tolerance range encompassing and wider than a first range of values.

14. The method of claim 1, wherein operation of the geographically-based graphical user interface in a given operational mode is indicated through the display of at least one graphical element over the map data of the geographically-based graphical user interface in a color or pattern corresponding to the respective operational mode.

15. A device, comprising:
a display screen;
a memory;
at least one processor; and
a gesture detection module,
the at least one processor being configured to cause the display screen to display a geographically-based graphical user interface including map data, the map data being displayed in a first view;
the gesture detection module being configured to receive input, the input comprising at least one input point;
the at least one processor being further configured:
to determine at least a first characteristic and a second characteristic of the input, the second characteristic being different from the first characteristic;
when the first characteristic of the input fulfils a first operational mode criterion, to process the input according to a first operational mode and causing display, on the display screen, of the map data in a second view, the second view being based on the second characteristic of the input; and
when the first characteristic of the input fulfils a second operational mode criterion, to process the input according to a second operational mode, the second operational mode criterion being different from the first operational mode criterion and the second operational mode being different from the first operational mode, and causing display, on the display screen, of the map data in a third view, the third view being based on the second characteristic of the input,
wherein the first characteristic is horizontal displacement (X) of an initial input point relative to a point at an edge of the display screen,
wherein the first operational mode criterion is fulfilled when the horizontal displacement takes a value in a first range of values, and
wherein the second operational mode criterion is fulfilled when the horizontal displacement takes a value in a second range of values.

16. The device of claim 15, wherein the display screen incorporates the gesture detection module, the display screen being a touch screen.

17. The device of claim 15, wherein the gesture detection module includes at least one of capacitive touch sensors, resistive touch sensors, ultrasonic sensors, infrared sensors or proximity sensors.

18. A non-transitory computer-readable storage medium, the computer-readable storage medium including instructions that when executed by a computer, cause the computer to perform operations comprising:
causing display of a geographically-based graphical user interface on a display screen of a portable display device, the geographically-based graphical user interface including map data, the map data being displayed in a first view;
receiving input comprising at least one input point;
determining at least a first characteristic and a second characteristic of the input, the second characteristic being different from the first characteristic;
when the first characteristic of the input fulfils a first operational mode criterion, processing the input according to a first operational mode and causing display, on the display screen, of the map data in a second view, the second view being based on the second characteristic of the input; and
when the first characteristic of the input fulfils a second operational mode criterion, processing the input according to a second operational mode, the second operational mode criterion being different from the first operational mode criterion and the second operational mode being different from the first operational mode, and causing display, on the display screen, of the map data in a third view, the third view being based on the second characteristic of the input,
wherein operation of the geographically-based graphical user interface in a given operational mode is indicated through the display of at least one graphical element over the map data of the geographically-based graphical user interface in a color or pattern corresponding to the respective operational mode.

* * * * *